J. E. WALSH.
Improvement in Portable Vertical-Hoists.
No. 131,983. Patented Oct. 8, 1872.
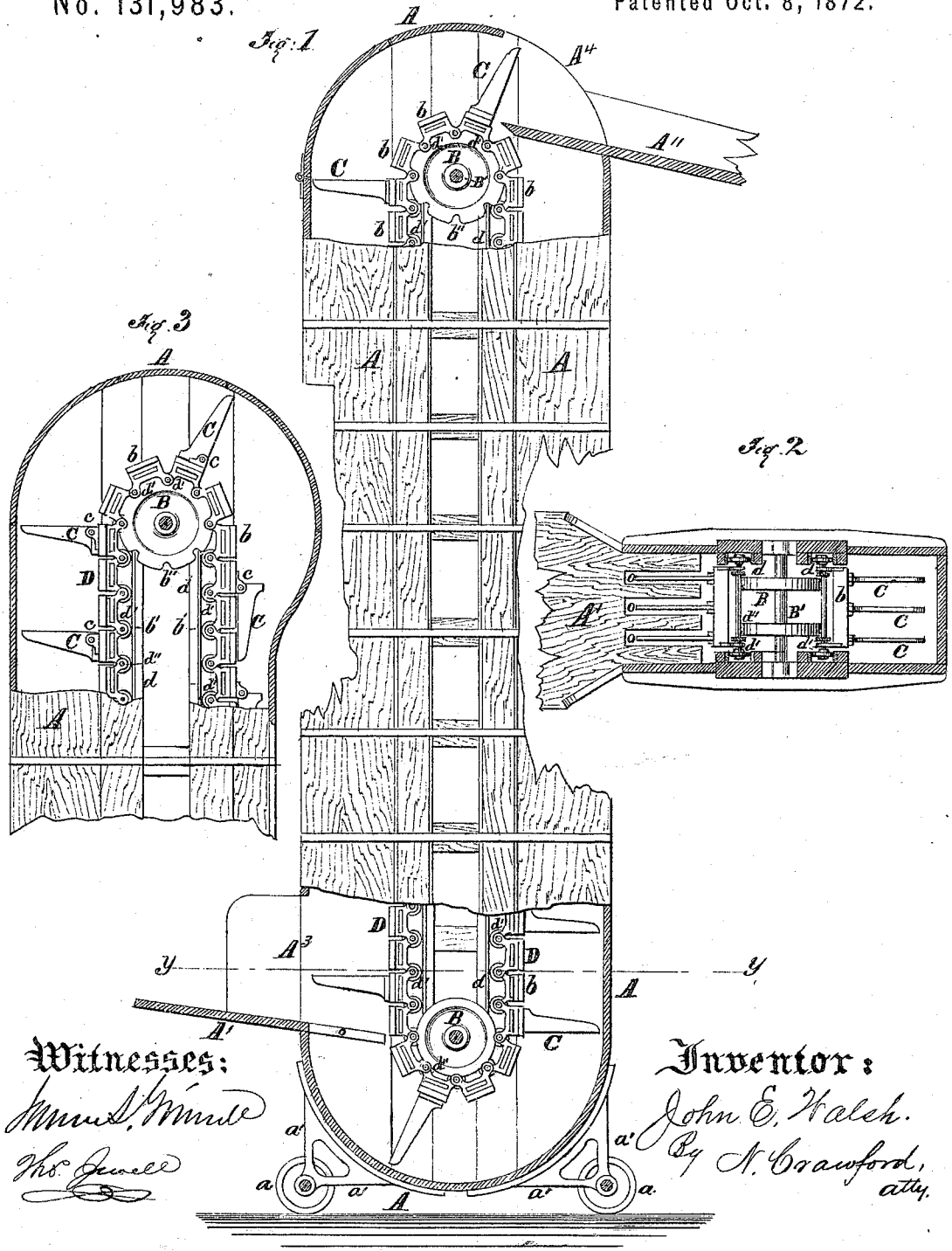

UNITED STATES PATENT OFFICE.

JOHN E. WALSH, OF NEW YORK, N. Y.

IMPROVEMENT IN PORTABLE VERTICAL HOISTS.

Specification forming part of Letters Patent No. 131,983, dated October 8, 1872.

*To all whom it may concern:*

Be it known that I, JOHN E. WALSH, of the city, county, and State of New York, have invented certain Improvements in Portable Vertical Hoists, of which the following is a specification:

The object of this invention is to hoist packages, bales, barrels, or goods of any kind from the hold of a vessel to the deck, or so that such packages may be transferred to a car or cart, to be transported to the storehouse, and also for hoisting the same packages from such car into the store-house where such goods are to be stored, or for use any where when goods or packages are to be hoisted; and it consists in the construction and arrangement of the parts that make the complete machine, as will be more fully hereinafter described.

In the drawing, Figure 1 is an upright side view of the hoist with a portion of the sides broken away to show the interior; Fig. 2 is a cross-section through Fig. 1 at $y\ y$; and Fig. 3 is a modification of the construction, shown in Fig. 1.

A is the casing or covering of the hoist, which may be of any proper material. $A^3$ and $A^4$ are openings in the casing of the hoist, $A^3$ being the opening near the lower end and where the receiving platform $A'$ is attached to receive the goods or packages to be hoisted, and at the opening $A^4$ at the upper end is the chute $A''$ which receives the goods or packages as they are hoisted and delivered upon said chute to slide by their own gravity away from opening $A^4$. $a\ a$ are wheels or small trucks revolving on proper axles in buckets $a'$, or parts of the casing constructed to receive them, and support the weight of the hoist as well as to facilitate the moving the hoist from place to place, as is necessary in almost any place where goods or packages are to be hoisted. The platform $A'$ and bottom of chute $A''$ has slots or openings $o\ o$ therein to allow the hoist brackets or tables that raise the goods to pass through them, and give space between the projecting brackets to support whatever may be put on the platform, and so that the traveling hoist-brackets will take a secure hold of the under side of the goods or packages as they lie upon the platform, and also in the bottom of the chute to allow the hoisting brackets to pass through after the goods they have raised have, by their own weight, in falling upon the chute slid or rolled down the chute out of the way of the brackets that hoisted them. B B are pulleys fast on proper axles or shafts $B'\ B'$ that revolve in bearings attached to and inside of casing A, and are adjustable so as to keep the endless belt or chain in proper strain. C C are the raising brackets or tables, and are attached to and revolve with an endless chain or belt that surrounds the pulleys B. These hoisting brackets or tables C are formed of several pieces that are fast to the chain or belt and project on their upper edges at right angles with the upright part of the chain or belt D, and are separated from each other to allow the slotted platform to extend between them to support whatever may be placed on the inner end of said platform, and to be raised by the hoisting-brackets, and any number of these may be used as to width of chain D. The endless chain D is formed by a series of links, $b$, having an open mortise to receive a base for the hoisting-brackets, and at their inner edge formed with eyes to receive a transverse bolt, $d''$, which passes through the eyes $d$ of the links $b$, and through wheels $d'$ which are outside of the links. The wheels $d'$ revolve freely upon the transverse rods or bolt $d''$, and bear upon a rail-track, $d$, that forms a groove for the wheels to travel in as the endless chain revolves around the pulleys B and thereby lessens the friction of the chain in traveling. The transverse rod $d''$, as it goes over the pulleys B, enters into notches $b'$ in the pulleys B, which prevents any slipping, so that the chain is sure to be revolved with the pulley, and hoist any weight that may be upon the hoisting-brackets. The hoisting-brackets C may be hinged to the base, as seen in Fig. 3 at $c$, so that when they have passed over the center of the upper pulley they will fall, as seen in said Fig. 3. This construction is preferable where heavy weights or packages are to be hoisted; but where only light packages are to be raised, a simple band with the separated hoisting-brackets firmly secured thereto will answer all practical purposes. The machine, when in upright position, can be moved about on its wheels $a$ to any desired position to be most advantageous for receiving and discharging goods in packages from the hold of a vessel or into a store-house, and by the arrangement of the wheels or casters $a$ to the base of the machine, it becomes an upright portable hoist, a machine heretofore much wanted in loading and unloading vessels, and placing goods or parcels in a store-house.

I do not describe or show any means for operating the hoist, as any power can be used to revolve the shafts B′ and thereby give motion to the machine. By casing in the hoisting-brackets a safe and quick delivery of all goods or parcels placed upon the slotted receiving platform is made upon the delivery-chute at the upper end of the machine.

Having thus described my invention, what I claim and desire to secure by Letters Patent, is—

1. The slotted receiving and delivery platform $A^1$ and $A^2$, in combination with two or more brackets, C, on endless chain or belt D, constructed and arranged to operate as described.

2. The upright hoist, constructed and operating as described, in combination with the wheels $a$ under the lower end of the hoist, substantially as shown.

JOHN E. WALSH.

Witnesses:
 JOHN R. O'HALLORAN,
 JAMES COWAN.